(12) United States Patent
Fauconnier et al.

(10) Patent No.: US 7,792,525 B2
(45) Date of Patent: Sep. 7, 2010

(54) METHOD FOR ACTIVATING RECORDINGS OF EVENTS CONCERNING TERMINALS AND EQUIPMENT THEREFOR

(75) Inventors: Dennis Fauconnier, Saint-Remy les Chevreuse (FR); Yann Sehedic, Vanves (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/624,991

(22) Filed: Nov. 24, 2009

(65) Prior Publication Data

US 2010/0075662 A1 Mar. 25, 2010

Related U.S. Application Data

(63) Continuation of application No. 10/555,827, filed as application No. PCT/FR2004/001095 on May 6, 2004, now Pat. No. 7,647,043.

(30) Foreign Application Priority Data

May 12, 2003 (FR) .................................. 03 05713

(51) Int. Cl.
*H04W 24/00* (2009.01)
(52) U.S. Cl. ................... 455/423; 455/424; 455/428; 455/560
(58) Field of Classification Search ................. 455/423, 455/403, 422.1, 424–425, 428, 445, 560, 455/434; 370/338, 345
See application file for complete search history.

(56) References Cited

U.S. PATENT DOCUMENTS

| 6,067,454 | A  | 5/2000  | Foti      |
| 6,169,896 | B1 | 1/2001  | Sant et al. |
| 6,263,187 | B1 | 7/2001  | Do        |
| 6,473,620 | B1 | 10/2002 | Park et al. |
| 7,069,008 | B1 | 6/2006  | Hill et al. |

(Continued)

FOREIGN PATENT DOCUMENTS

EP 1 018 846 A1 7/2000

(Continued)

OTHER PUBLICATIONS

ETSI TS 100 627 v4.6.1, Digital cellular telecommunications system (Phase 2); Subscriber and equipment trace (GSM 12.08 version 4.6.1), pp. 1-53 (Oct. 2001).

(Continued)

*Primary Examiner*—Kamran Afshar
(74) *Attorney, Agent, or Firm*—Fay Sharpe LLP

(57) ABSTRACT

The invention concerns a method which consists, in a radio communication system comprising a core network, at least one radio network controller connected to the core network and configured to control radio communications with terminals and at least one operation center capable of supervising said radio network controller, in: transmitting from the operating center to a radio network controller, a coded list of terminal identifiers; transmitting the coded list to the control network from the radio network controller; decoding the coded list at the core network; detecting at the core network a radio communication under the control of the radio network controller, with a terminal identified in the decoded list; and instructing the radio network controller, from the core network, to start a recording of events concerning the detected communication.

20 Claims, 1 Drawing Sheet

U.S. PATENT DOCUMENTS

| | | | |
|---|---|---|---|
| 7,647,043 B2 * | 1/2010 | Fauconnier et al. | ......... 455/423 |
| 2001/0034204 A1 | 10/2001 | Pentikainen | |
| 2004/0063428 A1 | 4/2004 | Jansson | |
| 2004/0121775 A1 | 6/2004 | Ropolyi et al. | |

FOREIGN PATENT DOCUMENTS

| | | |
|---|---|---|
| WO | 01/47182 A2 | 6/2001 |

OTHER PUBLICATIONS

ETSI TS 122 016 v5.0.0, Digital cellular telecommunications system (Phase 2+); Universal Mobile Telecommunications System (UMTS); International Mobile Equipment Identities (IMEI) (3GPP TS 22.016 version 5.0.0 Release 5), pp. 1-9 (Jun. 2002).

ETSI TS 125 413 v5.4.0, Universal Mobile Telecommunications System (UMTS); UTRAN Iu interface RANAP signalling (3GPP TS 25.413 version 5.4.0 Release 5), pp. 1-240 (Mar. 2003).

ETSI TS 123 003 v5.5.1, Digital cellular telecommunications system (Phase 2+); Universal Mobile Telecommunications System (UMTS); Numbering, Addressing and Identification (3GPP TS 23.003 version 5.5.1 Release 5), pp. 1-40 (Jan. 2003).

International Search Report, PCT/FR2004/001095, mailed Feb. 4, 2005, 2 pages (English translation).

PCT Written Opinion of the International Searching Authority, PCT/FR2004/001095, mailed Feb. 4, 2005, 4 pages (English translation).

* cited by examiner

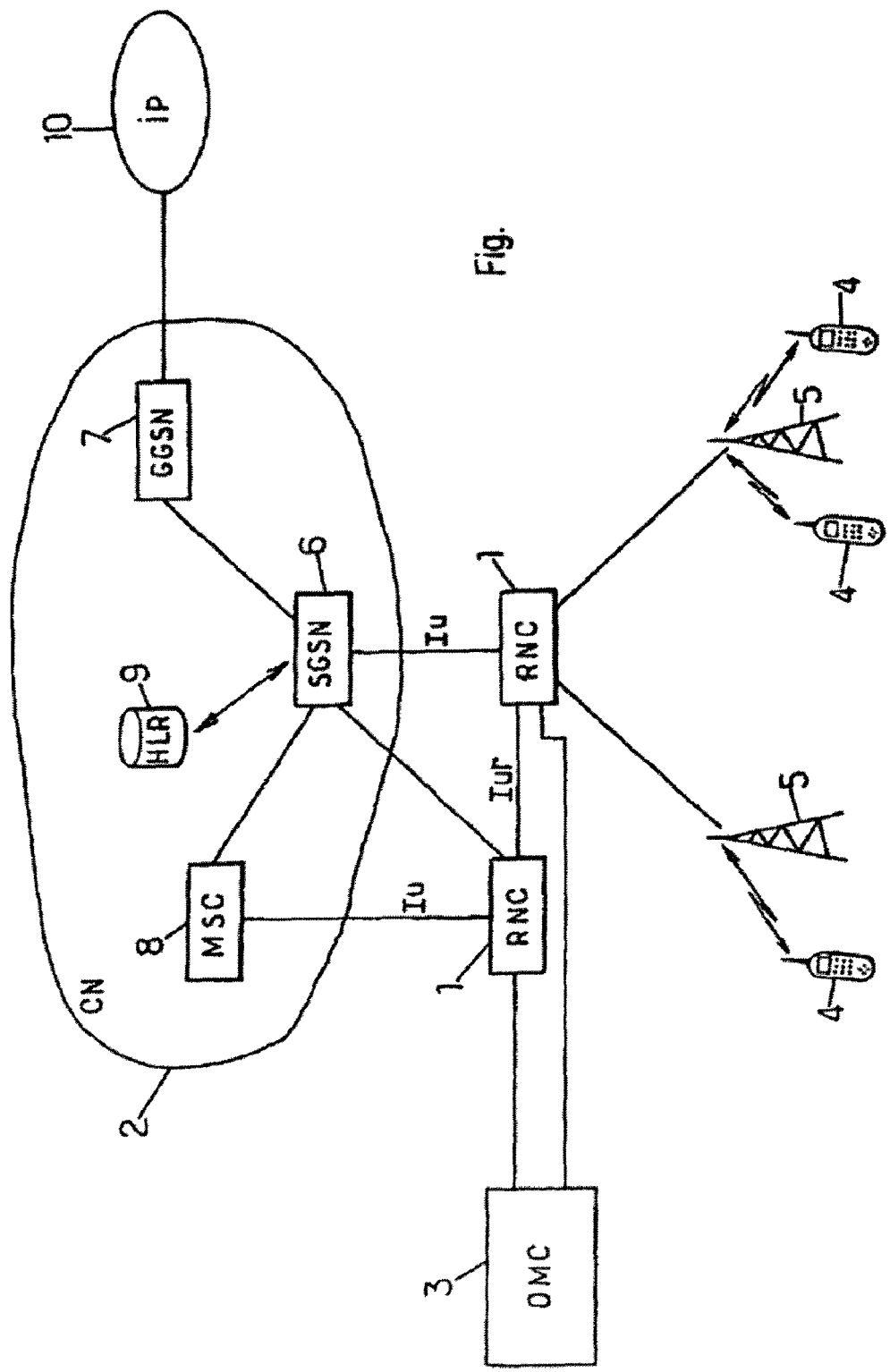

METHOD FOR ACTIVATING RECORDINGS OF EVENTS CONCERNING TERMINALS AND EQUIPMENT THEREFOR

CROSS-REFERENCE TO RELATED APPLICATIONS

This application is a continuation of, and claims any benefit associated with, U.S. patent application Ser. No. 10/555,827, now U.S. Pat. No. 7,647,043 which is a U.S. National Stage Entry of International App. No. PCT/FR2004/001095, filed May 6, 2004 and claims priority to France Pat. App. No. 03/05713, filed May 12, 2003. As such, this application is also a continuation of, and claims any benefit associated with International App. No. PCT/FR2004/001095, filed May 6, 2004, which claims priority to France Pat. App. No. 03/05713, filed May 12, 2003. The entire contents of each of the above-identified patent applications are fully incorporated herein by reference.

BACKGROUND

The present invention relates to recordings of events concerning the terminals in a radiocommunication system. It relates more particularly to the method of activating such recordings.

The recording of certain events that can occur in a call or an exchange of information with a terminal is a routine operation in radiocommunication systems. The duly stored events are normally signaling messages, typically of level 3, interchanged between the terminal and the radiocommunication system. Such an operation is known by the term "trace".

The trace is performed on one or more nodes of the radiocommunication system and can be used by the operator of this system for subsequent processing purposes (statistical analysis of calls in a geographic area, study of the behavior of a particular call, etc).

It has, for example, been the subject of standardization in the GSM (Global System for Mobile communications) system, in the technical specification TS 100 627 or GSM 12.08, version 4.6.1, "Subscriber and equipment trace", published in October 2001 by the ETSI (European Telecommunications Standards Institute).

In the UMTS (Universal Mobile Telecommunication System) system, it is provided for the trace to be able to be implemented in the radio part of the universal terrestrial radio access network (UTRAN) to record signaling elements on the Iu interfaces (between a switch of the core network and a radio network controller), Iur interfaces (between two radio network controllers), Iub interfaces (between a radio network controller and a base station) and radio interfaces (between a radio network controller and a radio terminal).

The activation of the trace involves transmitting an instruction to the node which will carry out the recording. This activation is normally based on the identifier of a terminal for which calls need to be the subject of a trace. The identifier of the terminal can relate to the subscriber using the terminal. In this case, the identifier will advantageously be the conventional IMSI (International Mobile Station Identity) parameter. It may also relate to the terminal equipment. In this case, the identifier will, for example, be the conventional IMEI (International Mobile station Equipment Identity) parameter, a parameter obtained from the IMEI, or even the IMEISV (IMEI Software Version) parameter.

When the trace needs to be performed by a radio network controller in a system such as UMTS, that is, in an RNC (Radio Network Controller), two modes of activation are possible.

In a first mode, the trace is activated by the transmission of an instruction to the RNC from the core network. It is typically the HLR (Home Location Register), which is a database of the core network containing information relating to the subscribers of the network, which then originates the instruction, which will be transmitted to the RNC via the Iu interface. This mode of activation of the trace by signaling (signaling activation) is particularly suitable for performing a trace on calls from a particular subscriber of the network.

In a second mode, the trace is activated locally on the RNC. This activation is normally performed via an operation and maintenance center, for example, the OMC in UMTS which transmits the instruction to the RNC concerned. This mode of activation of the trace (management activation) is well suited in particular to the cases where there is a desire for recordings on a given area of the network, possibly for a particular type of equipment.

The second mode of activation is widely used in practice, particularly in the GSM system, because it is simple to implement and also provides operators with relevant statistics, for example concerning the behavior of a terminal model in a targeted geographic area of their network.

Transposing this functionality to the UMTS system would entail transmitting a terminal identifier to the RNC. Now, the main players in the field concerned consider the systematic presence of such an identifier within the RNC to be totally undesirable for various reasons.

Furthermore, when the terminal identifier used is an equipment identity, for example the IMEI, a trace activation at the RNC based on this parameter would require the RNC to be able to know the IMEI of each terminal involved in a call under its control. Normally, when an IMEI is transmitted by a terminal to the core network, it is done so transparently for the RNC. The RNC can therefore have the IMEI parameter only if the core network sends it to it specifically. Such a mechanism would then result in a signaling overload prejudicial to the system.

SUMMARY

One object of the present invention is to overcome the abovementioned drawbacks, by proposing an effective mechanism for activating the trace.

The invention thus proposes a method of activating recordings of events concerning radio terminals in a radiocommunication system including a core network, at least one radio network controller connected to the core network and designed to control radio communications with terminals and at least one operation center suitable for supervising said radio network controller, the method including the following steps: transmitting, from the operation center to a radio network controller, a coded list of terminal identifiers; transmitting the coded list of terminal identifiers to the core network from the radio network controller; decoding the coded list of terminal identifiers at the core network; detecting, at the core network, a radio communication under the control of the radio network controller, with a terminal identified from the decoded list; and instructing the radio network controller, from the core network, to start a recording of events relating to the detected call.

Such a mode of operation ensures the flexibility of a local activation of the trace, via the operation center, which may be an OMC, or even a supervisory unit co-located with a radio network controller. It also enables the management of the trace activation instruction to be left to the core network. Furthermore, it allows for local activation of the trace in the radio network controller while avoiding systematically providing the latter with the terminal identifier for each call.

The invention also proposes a radiocommunication system designed to implement the method of activating the abovementioned trace.

It further proposes an operation center, a core network and a radio network controller suitable for contributing to the implementation of the method.

DESCRIPTION OF THE DRAWINGS

The single FIGURE is a simplified diagram of a system suitable for implementing the invention.

The FIGURE shows a radiocommunication system including RNCs 1, a core network CN 2 and an OMC 3, in accordance with the normal definitions of these component elements of a UMTS network summarized in the introduction.

DETAILED DESCRIPTION

The CN 2 includes a meshed arrangement of switches suitable for transmitting speech traffic in circuit mode such as the MSC (Mobile service Switching Center) 8 or data traffic in packet mode such as the SGSN (Serving GPRS Support Node) 6, GPRS standing for "General Packet Radio Service". The switches are conventionally linked to each other and/or to a particular switch used as a platform towards an external network, such as, for example, the GGSN (Gateway GPRS Support Node) 7 which is interconnected with an IP (Internet Protocol) type data network 10 in the example illustrated in the FIGURE.

The RNCs 1 are linked to the CN 2, via a switch of the CN, for example an SGSN 6 or an MSC 8. The standardized interface that links these elements is the Iu interface.

Moreover, the OMC 3 is capable of supervising and operating the RNCs 1, via the interface that links it to these elements. The OMC is a conventional operation and maintenance entity in the systems of the type of that in the FIGURE. However, other elements could also be used to supervise the system. The latter can be grouped under the generic functional designation of OSS (Operations Support System).

An RNC 1 has under its control a set of base stations 5 or nodes B according to the UMTS terminology, via which radio terminals 4 can communicate with the RNC.

According to the invention, when there is a desire to activate traces relating to terminals, for current or future calls, a request must be sent to the RNC 1 controlling these calls. For this, the request can be transmitted via the OMC 3, as in the case of a "management" type activation. This request is then transferred to the or each RNC 1 to which it is addressed, via the interface linking these entities. It is worth noting that the activation request could also be sent direct to the RNC 1 concerned or via a physical unit co-located with the RNC 1. However, a centralized operation unit for sending this request offers greater flexibility of implementation.

The trace activation request advantageously includes parameters relating to trace implementation procedures. For example, these parameters may specify a recording duration to be observed, or even a list identifying base stations under the control of the RNC 1 within the coverage area of which the calls must be the subject of a trace.

The trace activation request is generic inasmuch as it does not specify a particular terminal identifier (so as to avoid the risks stated in the introduction), but includes a coded list of terminal identifiers.

As indicated above, the term "terminal identifier" is understood to mean an identifier designating a subscriber or even an element. The latter case is assumed below.

The terminal identifier may be the IMEI, as is specified in the ETSI technical specification TS 123 003, version 5.5.1, Release 5, "Numbering, Addressing and Identification" (3GPP TS 23.003), published by the 3GPP (3rd Generation Partnership Project) in January 2003. It is also possible to use other parameters to identify the terminal. For example, the IMEISV can be used when it is available in the system used. This complements the IMEI with a software version (SV) number in accordance with the abovementioned technical specification 122 016. Naturally, any other relevant parameter may be used in this context. The term IMEI will be used hereinafter, without prejudicing the fact that the terminal identifier used may be different.

The generic trace activation request therefore includes a coded list of IMEIs for respective terminals. For example, the coding used may be an IMEI "mask", that is, a specification of the value of only certain bits of the IMEI, the unspecified bits being of any possible values.

Thus, the IMEI value for which a trace must be implemented is not communicated as such to the RNC in the generic trace activation request.

Advantageously, the RNC 1 having received the trace activation request determines a reference that it associates with the request, that is, with the coded list of IMEIs. This reference can subsequently be used to identify the traces made in relation to said activation request.

The RNC 1 then transmits, to a node of the CN 2, for example an MSC 8 or an SGSN 6, the coded list of IMEIs that it has received. This transmission is carried out without the RNC having previously decoded the coded list of IMEIs and preferably without it retaining a copy of it. This ensures that the IMEIs included in the coded list will not be known individually to the RNC 1. Advantageously, this transmission contains the corresponding reference determined by the RNC 1.

A distinction is therefore made from the "management" type trace activation, since the RNC does not implement the trace at this stage, inasmuch as it has not identified the IMEIs that must be the subject of a trace.

The node having received the coded list of IMEIs from the RNC 1, for example the SGSN 6, then decodes this list. It then checks, each time a call is set up or information is interchanged with a terminal within the area under the control of the RNC 1, whether the terminal has an IMEI belonging to the coded list of IMEIs. When the coding used is a mask, the SGSN 6 checks whether this mask applies to the IMEI of the terminal engaged in the call, that is, whether the IMEI of this terminal has the format specified by the mask. If it does, this means that the call involving this terminal must be the subject of a trace.

If the SGSN 6 has detected a call that must be the subject of a trace, it then instructs the activation of such a trace at the RNC 1, in the same way as it would have done if the "signaling" activation mode had been implemented in the system represented in the FIGURE.

Advantageously, the activation instruction sent from the SGSN 6 to the RNC 1 contains the reference previously determined by the RNC 1. The transmission of this reference makes it possible to establish the link between the trace activation request initially formulated by the OMC 3, that is, the initial transmission of the coded list of IMEIs, and the trace finally implemented at the RNC 1.

The trace activation instruction can be sent via a new signaling message or even an existing message between the CN 2 and the RNC 1. In the latter case, the message "CN Invoke Trace" specified in section 8.17 of the technical specification 25.413, version 5.4.0, Release 5, "UTRAN Iu interface RANAP signaling", published by the 3GPP in March 2003, can advantageously be used.

This part of the trace activation mechanism is similar to the "signaling" activation. The trace activation instruction transmitted by the CN 2 identifies the call that must be the subject of a trace, for example, by indicating to the RNC 1 an identifier of the corresponding connection.

On receipt of the trace activation instruction, the RNC 1 is therefore able to start the recording of events for the detected call, as it would have done in the case of a "signaling" type activation. Furthermore, when the activation message received from the CN 2 includes the reference previously determined for the initial trace request, the RNC 1 finds the parameters relating to the trace implementation procedures that had been transmitted to it initially by the OMC 3, and it links them to the trace that it is about to start.

It is worth noting that the activation instruction can itself contain other information relating to recording procedures that will be recognized by the RNC 1, for example a designation of the type of trace to be performed. The type of trace then gives indications on trace implementation procedures, for example on the events to be recorded. The activation instruction can also contain the identity of an OMC to which the trace will be sent, once completed, for subsequent analysis and processing purposes. The message "CN Invoke Trace" described above moreover provides fields for this purpose.

With the invention disclosed above, the trace activation therefore has the simplicity of implementation of the "management" mode since the initial trace request is made locally, possibly via an OMC. It also avoids the drawbacks associated with this trace activation mode and in particular the need for the RNC concerned to know and check the identity of each terminal in its control area. This latter point is handled by the intervention of the CN which ultimately instructs the activation of the trace when it detects a call or an information interchange involving a terminal that is part of the group of terminals to be traced, according to a procedure similar to the "signaling" activation mode.

We claim:

1. A method of activating a recording of events relating to a radio communication in a radiocommunication system, comprising:
   a) receiving a trace activation request at a radio network controller of the radiocommunication system, the trace activation request including a coded list of terminal identifiers associated with corresponding subscribers or system elements for which traces of radio communications are desired and parameters relating to trace implementation procedures, wherein the parameters include at least one of a recording duration to be observed in conjunction with subsequent traces of radio communications and a list of system elements associated with at least a portion of a coverage area for the radio network controller for which radio communications become the subject of the subsequent traces;
   b) transmitting the coded list of terminal identifiers to a network node in a core network of the radiocommunication system;
   c) receiving a trace activation instruction at the radio network controller in response to decoding of the coded list of terminal identifiers by the network node and the network node detecting a radio communication associated with a terminal identifier from the decoded list of terminal identifiers and a corresponding subscriber or system element interfacing with the radio network controller; and
   d) starting a recording of events relating to the detected radio communication and the corresponding subscriber or system element, wherein the parameters relating to trace implementation procedures received in a) are observed in conjunction with the recording.

2. The method set forth in claim 1 wherein the parameters relating to trace implementation procedures include at least one of a recording duration to be observed in conjunction with the recording in d) and a list of system elements associated with at least a portion of a coverage area for the radio network controller for which radio communications become the subject of the recording in d).

3. The method set forth in claim 1, further comprising:
   e) allocating a reference to the coded list of terminal identifiers received in a); and
   f) transmitting the allocated reference with the corresponding coded list of terminal identifiers transmitted in b).

4. The method set forth in claim 3 wherein the trace activation instruction received in c) includes the reference allocated in e) such that the trace implementation procedures received in the trace activation instruction can be implemented in conjunction with the recording in d).

5. The method set forth in claim 1 wherein the trace activation instruction includes information relating to trace implementation procedures.

6. The method set forth in claim 5 wherein the information relating to trace implementation procedures includes at least one of a type of trace to be performed in conjunction with the recording in d), one or more specific event to be recorded in conjunction with the recording in d), and identification of an operations node to which the recording from d) is to be sent.

7. The method set forth in claim 1 wherein the trace activation request in a) is received from an operations node.

8. The method set forth in claim 1 wherein the network node comprises a serving node.

9. An apparatus for activating a recording of events relating to a radio communication in a radiocommunication system, comprising:
   means for receiving a trace activation request from an operations node of the radiocommunication system, the trace activation request including a coded list of terminal identifiers associated with corresponding subscribers or system elements for which traces of radio communications are desired and parameters relating to trace implementation procedures, wherein the parameters include at least one of a recording duration to be observed in conjunction with subsequent traces of radio communications and a list of system elements associated with at least a portion of a coverage area for the radio network controller for which radio communications become the subject of the subsequent traces;
   means for transmitting the coded list of terminal identifiers to a radiocommunication node in a core network of the radiocommunication system;
   means for receiving a trace activation instruction in response to decoding of the coded list of terminal identifiers by the radiocommunication node and the radiocommunication node detecting a radio communication associated with a terminal identifier from the decoded list of terminal identifiers and a corresponding subscriber or system element;
   means for interfacing with the corresponding subscriber or system element; and means for starting a recording of events relating to the detected radio communication and the corresponding subscriber or system element, wherein the parameters relating to trace implementation procedures received in the trace activation request are observed in conjunction with the recording.

10. The apparatus set forth in claim 9 wherein the parameters relating to trace implementation procedures include at least one of a recording duration to be observed in conjunction with the recording of events and a list of system elements associated with at least a portion of a coverage area for which radio communications become the subject of the recording of events.

11. The apparatus set forth in claim 9, further comprising:
means for allocating a reference to the coded list of terminal identifiers received from the operations node;
wherein the means for transmitting the coded list of terminal identifiers includes means for transmitting the allocated reference.

12. The apparatus set forth in claim 11 wherein the trace activation instruction received from the radiocommunication node includes the reference allocated to the corresponding coded list of terminal identifiers such that the trace implementation procedures received in the trace activation instruction can be implemented in conjunction with the recording of events.

13. The apparatus set forth in claim 8 wherein the trace activation instruction includes information relating to trace implementation procedures.

14. The apparatus set forth in claim 13 wherein the information relating to trace implementation procedures includes at least one of a type of trace to be performed in conjunction with the recording of events, one or more specific event to be recorded in conjunction with the recording of events, and identification of an operations node to which the recording of events is to be sent.

15. A method of activating a recording of events relating to a radio communication in a radiocommunication system, comprising:
a) receiving a trace activation request, the trace activation request including parameters relating to trace implementation procedures;
b) transmitting the coded list of terminal identifiers to a core network;
c) receiving a trace activation instruction, wherein the trace activation instruction is based at least in part on decoding of the coded list of terminal identifiers by the core network and the core network detecting a radio communication associated with a terminal identifier from the decoded list of terminal identifiers; and
d) starting a recording of events relating to the detected radio communication, wherein the parameters relating to trace implementation procedures received in a) include at least one of a recording duration to be observed in conjunction with subsequent traces of radio communications and a list of system elements associated with at least a portion of a coverage area for the radio network controller for which radio communications become the subject of the subsequent traces.

16. The method set forth in claim 15, further comprising:
e) allocating a reference to the coded list of terminal identifiers received in a); and
f) transmitting the allocated reference with the corresponding coded list of terminal identifiers transmitted in b).

17. The method set forth in claim 16 wherein the trace activation instruction received in c) includes the reference allocated in e).

18. The method set forth in claim 16 wherein the trace activation request in a) and the trace activation instruction in c) are received at a radio network controller.

19. The method set forth in claim 16 wherein the trace activation request in a) is received from an operations node.

20. The method set forth in claim 16 wherein the core network includes a serving node, the coded list of terminal identifiers in b) being transmitted to the serving node and the trace activation instruction in c) being received from the serving node, wherein the trace activation instruction is based at least in part on decoding the coded list of terminal identifiers by the serving node and the serving node detecting the radio communication associated with the terminal identifier from the decoded list of terminal identifiers.

* * * * *